United States Patent [19]

Robinson, Jr.

[11] 4,327,850
[45] May 4, 1982

[54] GAME SLING APPARATUS

[76] Inventor: George J. Robinson, Jr., R.R. #1, Box 18, Floris, Iowa 52560

[21] Appl. No.: 214,245

[22] Filed: Dec. 8, 1980

[51] Int. Cl.³ .............................................. A45F 3/00
[52] U.S. Cl. .................................... 224/103; 224/202; 224/921
[58] Field of Search ............... 224/103, 202, 257, 258, 224/921

[56] References Cited

U.S. PATENT DOCUMENTS

| | | | |
|---|---|---|---|
| 723,179 | 3/1903 | Peters | 224/921 X |
| 825,753 | 7/1906 | Paul | 224/202 |
| 1,302,312 | 4/1919 | Cook | 224/208 X |
| 1,650,491 | 11/1927 | Calvert | 224/921 X |
| 2,959,333 | 11/1960 | Baggett | 224/103 |
| 3,096,010 | 7/1963 | Rasmussen | 224/921 X |
| 4,261,493 | 4/1981 | Newman | 224/257 |

Primary Examiner—Steven M. Pollard
Attorney, Agent, or Firm—Robert S. Smith

[57] ABSTRACT

Apparatus intended for hunters and trappers for moving animals. The apparatus includes a shoulder sling having first and second ends and a secondary strap dimensioned and configured for extending around the chest and back of the user and having first and second ends. The first and second ends of the secondary strap are respectively joined to the first and second ends of the shoulder sling. First and second ring shaped members are carried on the sling respectively at the first and second ends of the sling. First and second gambrells are carried on discrete lanyards fixed to the first ring shaped member and third and fourth gambrells are carried on discrete lanyards fixed to the second ring shaped member.

6 Claims, 8 Drawing Figures

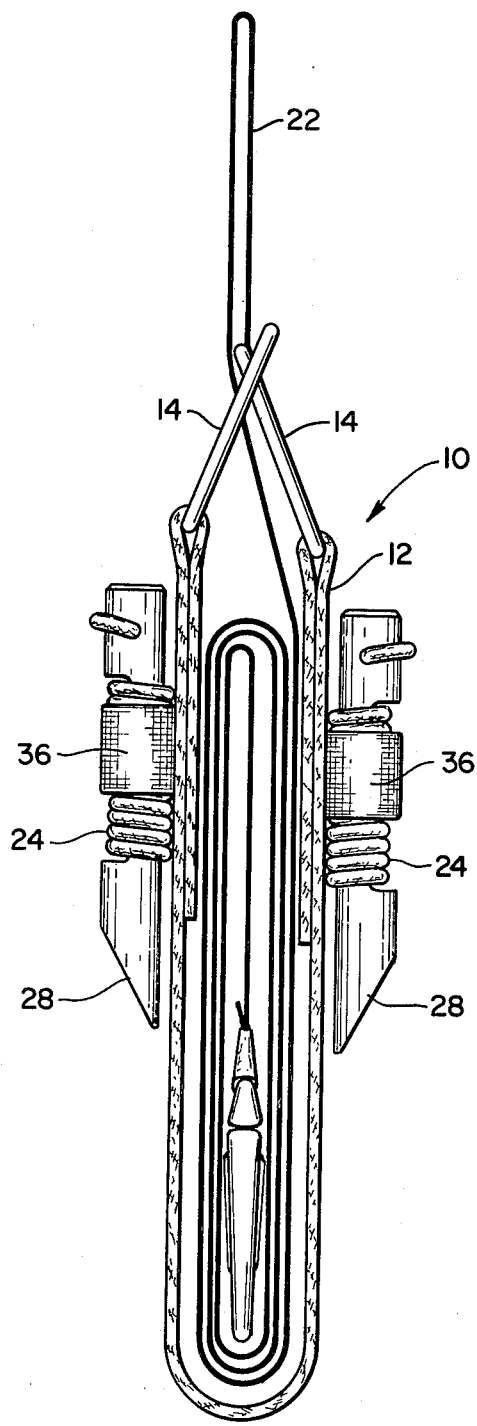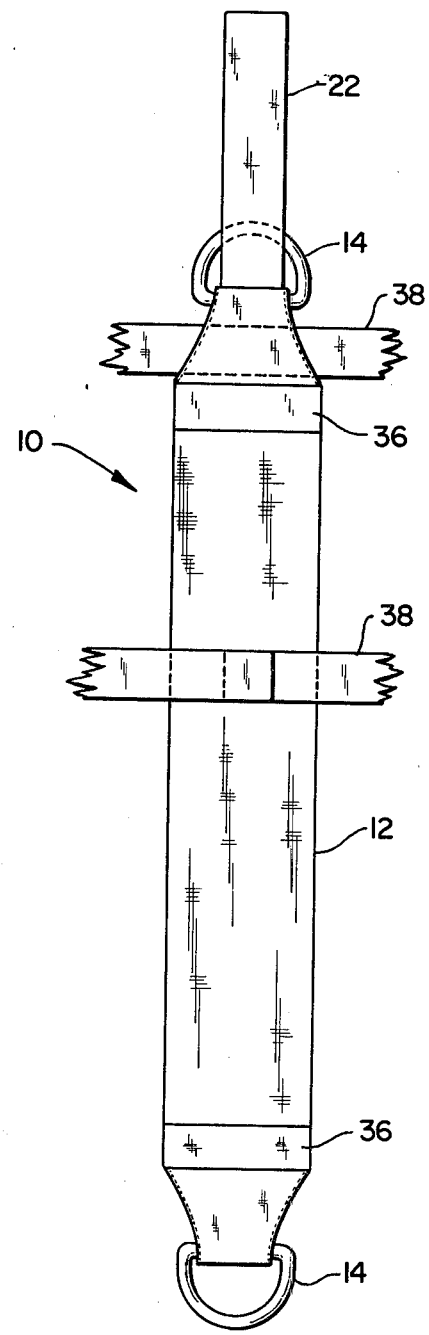
FIG. 4
FIG. 5

GAME SLING APPARATUS

BACKGROUND OF THE INVENTION

The present invention relates to hunting apparatus and particularly to apparatus for moving game.

Hunters as well as trappers encounter substantial difficulty in carrying game which has been shot or trapped. This has great significance when the game must be carried for great distances either to return to some base station or to continue to hunt.

It is a primary object of the invention to provide apparatus which will enable the user to keep his hands free and yet easily and comfortably carry game animals and the like.

It is another object of the invention to provide apparatus which is compact and light in weight so that the user is impeded a minimum amount as a result of carrying the apparatus.

Still another object of the invention is to provide apparatus which is simple and inexpensive to manufacture.

SUMMARY OF THE INVENTION

It has now been found that these and other objects of the invention may be attained in apparatus for moving animals which includes a shoulder sling having first and second ends and a secondary strap dimensioned and configured for extending around the chest and back of the user and having first and second ends. The first and second ends of the secondary strap are respectively joined to the first and second ends of the shoulder sling. First and second ring shaped members are carried on the sling respectively at the first and second ends of the sling. First and second gambrells are carried on discrete lanyards fixed to the first ring shaped member and third and fourth gambrells are carried on discrete lanyards fixed to the second ring shaped member.

In one form of the apparatus each lanyard has a noose shaped portion which extends through one of the gambrells carried thereon. Each gambrell may be elongated and may have an axial midsection which has a smaller cross section than the axial extremity thereof. At least two elastic loop shaped members may extend from the sling member at axially spaced locations and may be dimensioned and configured for retaining the gambrells.

An additional plurality of elastic loop shaped members may extend from the sling member at axially spaced locations which are dimensioned and configured for engaging the apparatus and holding it in compact relationship. The apparatus may further include a loop shaped member fixed to the second ring shaped member and which is dimensioned and configured for engagement with an associated belt disposed around the waist of a user.

In one form a shoulder sling has first and second ends and a secondary strap may be dimensioned and configured for extending around the chest and back of the user and have first and second ends. The first and second ends of the secondary strap may be respectively joined to the first and second ends of the shoulder sling. First and second ring shaped members may be carried on the sling respectively at the first and second ends of the sling and may further include a single noose shaped member extending from the secondary strap.

BRIEF DESCRIPTION OF THE ACCOMPANYING DRAWING

The invention will be understood by reference to the accompanying drawing in which:

FIG. 4 is a side elevational view of the folded apparatus in accordance with the invention illustrated in FIG. 1;

FIG. 5 is a plan view of a partially broken away sling in accordance with one form of the invention;

DESCRIPTION OF THE PREFERRED EMBODIMENT

Figure 1:
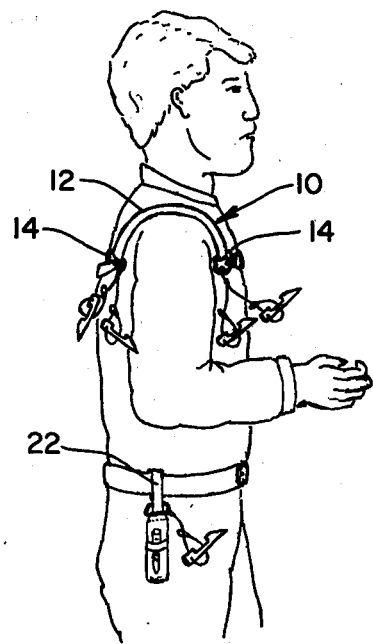
FIG. 1 is a side elevational view of a human being on which are disposed a first and second identical embodiments of the apparatus in accordance with the invention, one of which is disposed on a belt around the waist of the user and one is carried on the shoulder of the user.
Figure 2:
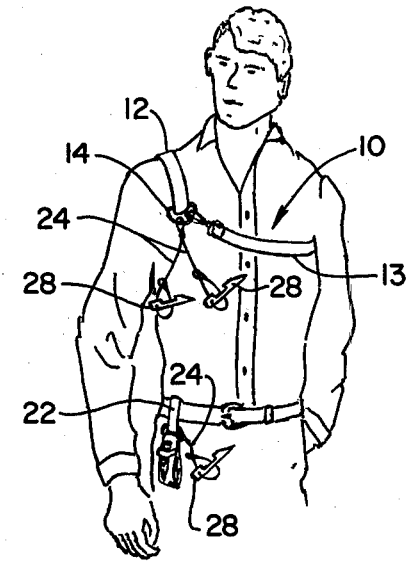
FIG. 2 is a front elevational view similar to that of FIG. 1.

Referring now to FIGS. 1, 2, 4, 5, 6, and 7 there is shown a shoulder sling apparatus 10 in accordance with the invention which includes a first sling shaped strap or shoulder sling 12 which in its preferred form is provided with a D-shaped ring 14 at each axial extremity thereof. A chest or secondary strap 13 extends around the chest and back of the user to secure the sling shaped strap 12 in place when carried on the shoulder of a user.

In passing over the back and chest of the user the secondary strap 13 passes under the arm which is opposite to the shoulder on which the first sling shaped strap 12 is carried. The arrangement provides for maximum stability.

Figure 8:
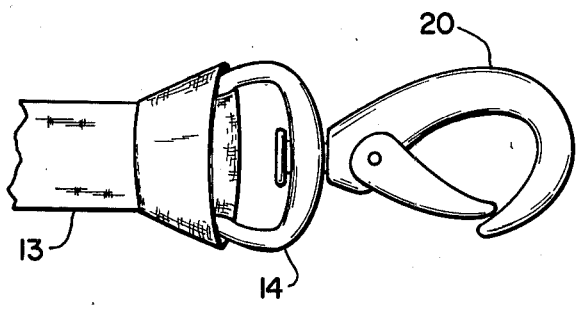
FIG. 8 is a broken away elevational view illustrating a portion of another embodiment of the apparatus in accordance with the invention.

As best seen in FIG. 8, the secondary strap 13 may also be provided with D-shaped rings 14, which are in turn provided with a snap 20 for engagement with the D-shaped ring 14 of the first sling strap 12. A belt loop 22 may be provided which is fixed to one axial extremity of the first sling strap 12 as best seen in FIGS. 1, 2, 4, and 5.

Figure 6:
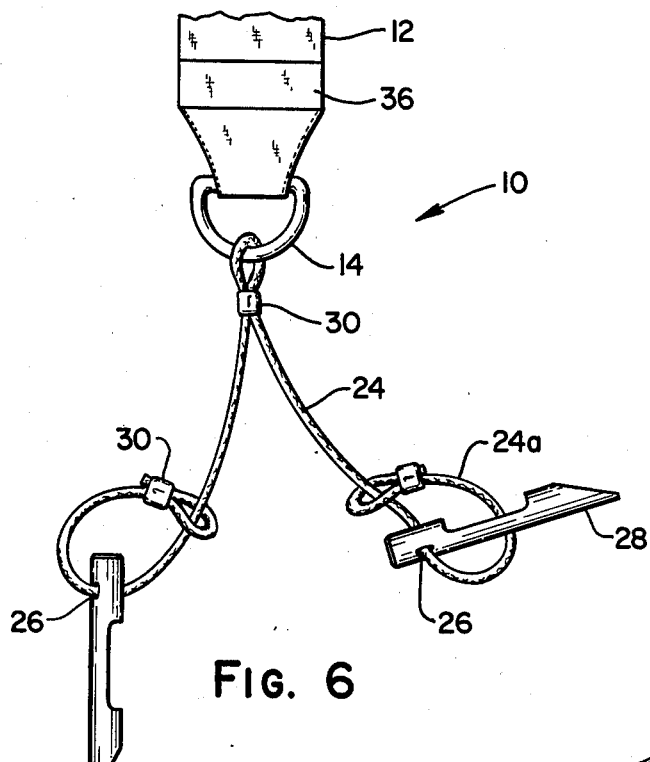
FIG. 6 is a perspective view in greater detail of the apparatus illustrated in FIG. 1 and showing the apparatus in greater detail.

As best seen in FIG. 6, discrete lanyards 24, 24, which may be fabricated from a single piece of nylon rope, extend from each ring shaped member 14 and have a noose shaped axial extremity 24a which extends through a hole 26 in a gambrell 28. Crimped band members 30, which may be manufactured of copper or other metallic substance, may be provided to hold the nylon rope as illustrated in FIG. 6. Each gambrell 28 will ordinarily have an axial midsection which has a smaller cross section than the axial extremities thereof.

Figure 7:
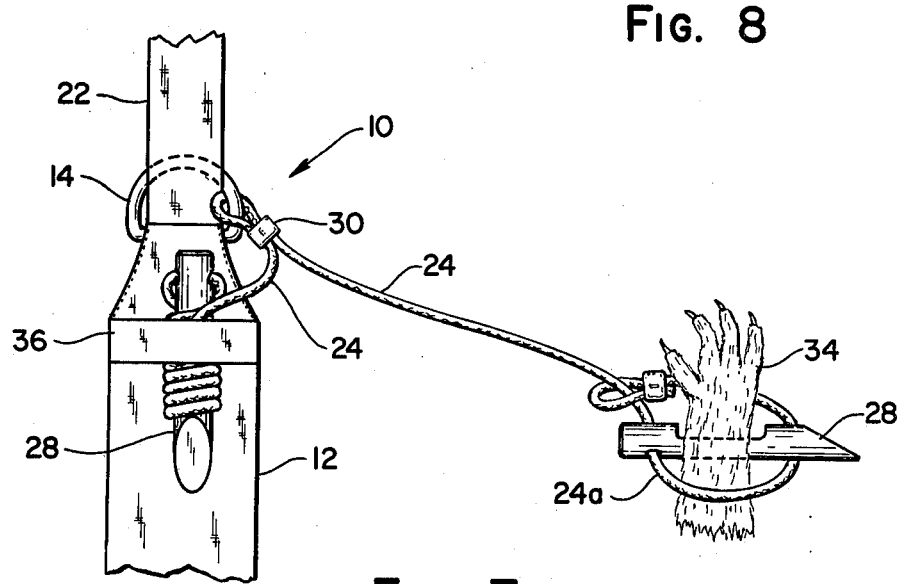
FIG. 7 is a fragmentary view illustrating the manner of operation of the apparatus illustrated in FIG. 6 in greater detail.

The manner of cooperation of the gambrell 28 with the paw 34 of an animal is best illustrated in FIG. 7. It will be understood that the paw 34 is slit with a hunting knife and the gambrell 28 is inserted therein and thereafter the noose 24a is drawn tightly around the paw 34.

Ordinarily the apparatus will be provided with two gambrells 28 carried on each D-shaped ring 14 so that the entire apparatus includes four discrete gambrells 28. As best illustrated in FIGS. 7 and 5, the gambrell 28 with its lanyard twisted around it is carried within an elasticized loop 36 and is fixed to first sling strap 12. Each first sling strap 12 is provided with two elasticized loops 36 disposed at axially spaced locations and each allows the carrying of a gambrell 28 and its associated lanyard 24 in the manner illustrated in FIG. 7. The first sling strap 12 is also provided with two loop shaped elastic members 38 which are fixed thereto at axially spaced locations. The loop shaped elastic members 38 are provided to restrain the entire apparatus prior to the time of actual use for carrying game animals.

As best illustrated in FIG. 4, the apparatus may be compactly folded and carried on the belt of a user as best illustrated in FIGS. 4 and 1.

It will be seen that the apparatus in accordance with the invention allows the hunter or trapper to go out seeking game without the necessity for carrying a heavy apparatus for carrying game which is taken. As an example, a raccoon hunter may carry the apparatus in accordance with the invention on his belt initially. After taking the initial raccoon, the hind feet are fastened respectively to a gambrell 28 secured to the front ring shaped member 14 and to a gambrell 28 which is fastened to the rear ring shaped member 14. In this manner the animal is perfectly balanced on the shoulder. When the second raccoon is bagged one leg of the first raccoon is released from one of the gambrells 28 and the second raccoon is attached to the same gambrell 28 so that a stable arrangement is again achieved. A third raccoon may be carried in the same manner as the first raccoon was initially carried. Thereafter if a fourth raccoon is carried each may be carried by one paw fixed to a single gambrell 28.

For game such as coyote, wolf, bobcat, etc. a person will usually carry only one out at a time, and normally both forelegs will be fastened to the two gambrells 28, 28 in front and both hind legs to gambrells 28, 28 in the rear. It will be seen that the animal is evenly balanced on the shoulder of the user.

For smaller game such as rabbit, squirrel, and game bird, the apparatus 10 may be carried on the belt of the user even while holding game. It has been found that two squirrels or the like will fit easily on each of the gambrells 28.

Figure 3:
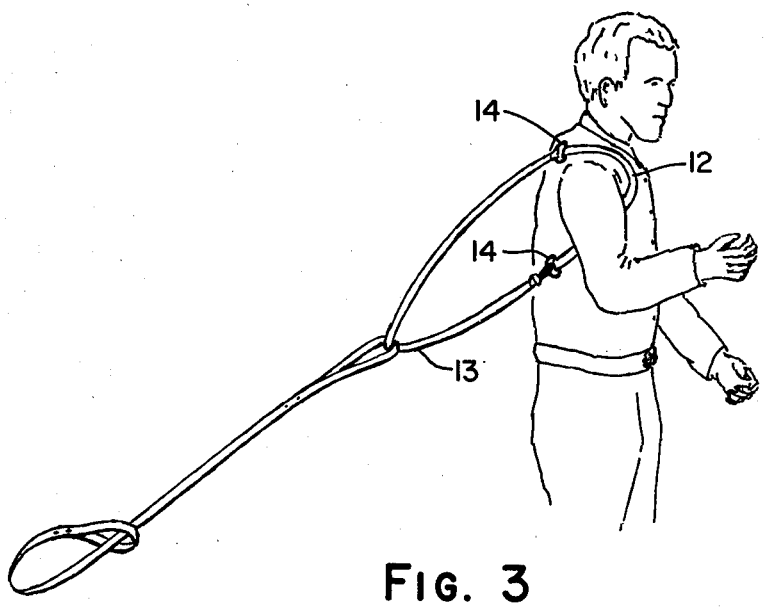
FIG. 3 is a side elevational view of a human being on which an embodiment of the apparatus in accordance with the invention is carried which is particularly suited for carrying large game such as deer.

For very large game such as deer or bear, the secondary strap 15, which extends from the D-shaped members 14 across the chest and back of the user, is repositioned to extend to the rear of the person using it as illustrated in FIG. 3 and a large game sling is used.

An advantage to the apparatus in accordance with the invention is that many wild game animals have fleas, lice or ticks on them and the hunter or trapper is less vulnerable to such infestation when the apparatus in accordance with the invention is utilized.

The sling strap 12 ordinarily may be manufactured of two inch by twenty inch nylon belt. The D-shaped member 14 ordinarily will be manufactured of 5/32 inch material and have a width of approximately one and ½ inches. The rings 14 will be manufactured of 5/32 inch material and have a width of approximately 1½ inches and a depth of 1¼ inches. The loop 36 will ordinarily be manufactured of flat braided elastic material which is ¾ inch by 3 inches. The loop 38 will ordinarily be manufactured of the same ¾ material having a length of 6 inches. The chest or secondary strap 13 will ordinarily be manufactured of 1 inch by 5 feet nylon belt. The large animal sling will ordinarily be manufactured with ¾ inch nylon belting material having a length of 5 feet. The front and rear lanyards 24 for the gambrells 28 ordinarily will be manufactured from nylon ropes each having a length of 20 inches and a diameter of ⅛ inch. The gambrells 28 will ordinarily have dimensions of approximately 3 inches by ⅜ inch and be manufactured of hickory, oak or plastic. The crimped band members 30 will, at least in come cases, be manufactured from a ⅜ inch long axial section of ¼ inch copper tubing.

It will thus be seen that the apparatus is small enough to carry on the person of the user at all times while hunting and yet strong enough to handle almost all situations likely to be encountered by the average hunter.

Having thus described my invention I claim:

1. Apparatus for moving animals which comprises:
   a shoulder sling having first and second ends;
   a secondary strap dimensioned and configured for extending around the chest and back of the user and having first and second ends, said first and second ends of said secondary strap being respectively joined to said first and second ends of said shoulder sling;
   first and second ring shaped members carried on said sling respectively at said first and second ends of said sling;
   first and second gambrells carried on discrete lanyards fixed to said first ring shaped member; and
   third and fourth gambrells carried on discrete lanyards fixed to said second ring shaped member.

2. The apparatus as described in claim 1, wherein:
   each lanyard carrying one of said gambrells has a noose shaped portion which extends through the gambrell on which it is carried.

3. The apparatus as described in claim 2, wherein:
   said gambrell is elongated and has an axial midsection which has a smaller cross section than the axial extremity thereof.

4. The apparatus as described in claim 3, further including:
   at least two elastic loop shaped members extending from said sling member at axial spaced locations, each loop shaped member being dimensioned and configured for retaining said gambrells.

5. The apparatus as described in claim 4, further including:
   an additional plurality of elastic loop shaped members extending from said sling member at axially spaced locations which are dimensioned and configured for engaging the apparatus and holding it in compact relationship.

6. The apparatus as described in claim 5, wherein:
   said apparatus further includes a loop shaped member fixed to said second ring shaped member and which is dimensioned and configured for engagement with an associated belt disposed around the waist of a user.

* * * * *